No. 775,545. PATENTED NOV. 22, 1904.
W. RIGGS.
DECOY.
APPLICATION FILED FEB. 16, 1904.
NO MODEL. 2 SHEETS—SHEET 1.

Witnesses
Inventor
W. Riggs
by James J. Shuhy, Attorney

No. 775,545. PATENTED NOV. 22, 1904.
W. RIGGS.
DECOY.
APPLICATION FILED FEB. 16, 1904.
NO MODEL. 2 SHEETS—SHEET 2.
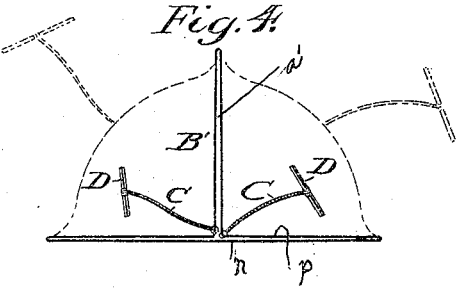
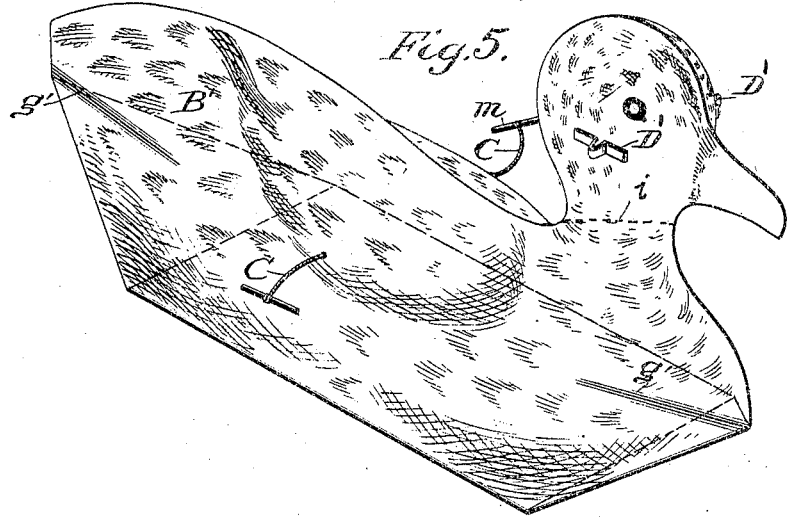
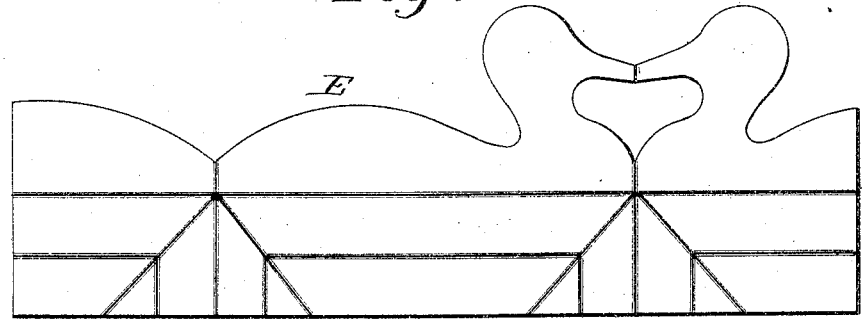

No. 775,545. Patented November 22, 1904.

UNITED STATES PATENT OFFICE.

WHITTAKER RIGGS, OF NEW ORLEANS, LOUISIANA.

DECOY.

SPECIFICATION forming part of Letters Patent No. 775,545, dated November 22, 1904.

Application filed February 16, 1904. Serial No. 193,790. (No model.)

*To all whom it may concern:*

Be it known that I, WHITTAKER RIGGS, a citizen of the United States, residing at New Orleans, in the parish of Orleans and State of Louisiana, have invented new and useful Improvements in Decoys, of which the following is a specification.

My invention pertains to decoys; and it has for its object to provide a very light and inexpensive decoy of such construction that it may be readily folded into compact form, so as to take up but a minimum amount of space, and may as readily be distended or set up ready for use without resort to inflation.

With the foregoing in mind the invention will be fully understood from the following description and claims when taken in connection with the accompanying drawings, forming part of this specification, in which—

Figure 1:
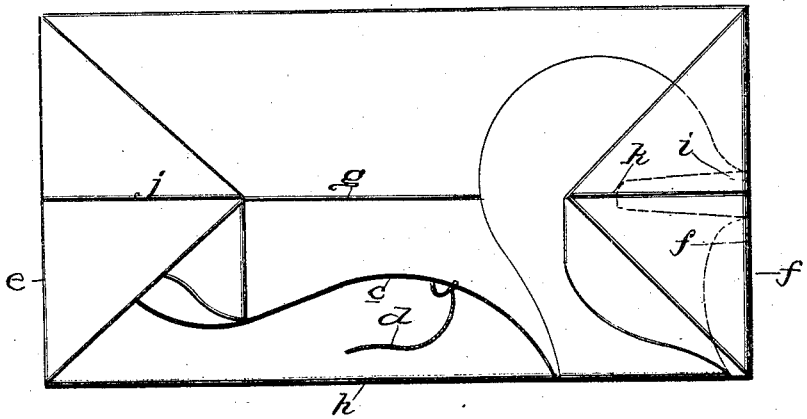
Figure 2:
Figure 3:
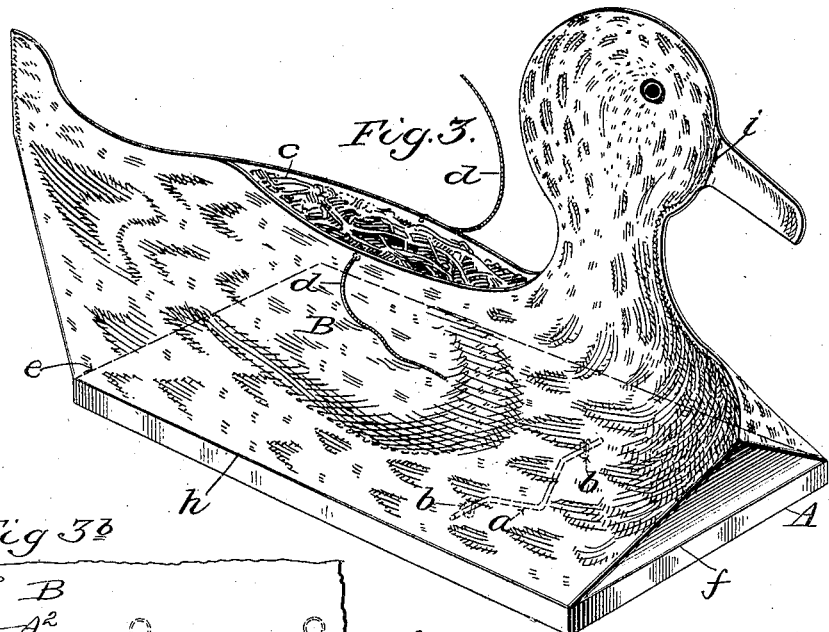

Figure 1 is a plan view of a decoy constituting one embodiment of my invention as the same appears when folded and ready to be carried in a hunting bag or satchel. Fig. 2 is an edge elevation of the same. Fig. 3 is a perspective view illustrating the decoy as it appears when its body is set up or distended and stuffed with grass or other suitable material. Fig. $3^a$ is a detail view illustrative of the manner in which I perfer to detachably connect the body of the decoy to the base thereof. Fig. $3^b$ is a detail plan view also illustrative of the manner in which I prefer to detachably connect the body of the decoy to the base thereof. Fig. 4 is a transverse section taken through the body of a modified embodiment of my invention, the same being shown by full lines in a partly-folded state and by dotted lines as shaped—*i. e.*, set up or distended. Fig. 5 is a perspective view of the modified decoy as it appears when shaped or distended and ready for use, and Fig. 6 is a plan view of the blank of which the decoy shown in Figs. 4 and 5 is formed.

Referring by letter to the said drawings, and more particularly to Figs. 1 to $3^a$ thereof, A is the base of the decoy. The said base is preferably of wood, but may be of any other material adapted to float on the water. It is designed more particularly for use when the decoy is to be used in rough water and then to hold the decoy in an upright life-like position and against overturning. On its lower side the base is provided with a loop $a$, preferably of wire, which is hinged, as indicated by $b$, so as to fold flat against the base when not in use, and is designed for the connection of an anchor-cord. (Not shown.) When desirable, the said loop may be of cord or other flexible material capable of being pressed against the base without departure from my invention. B is the body of the decoy, which may be either permanently or detachably connected to the base by any suitable means. The detachable connection of the body to the base shown in Figs. $3^a$, $3^b$ is advantageous, since in virtue of the same the base may be removed from the body when the decoy is to be used in smooth water, and the decoy thereby rendered lighter and more compact. The said illustrated detachable connection is effected by male fastener members $A^2$, arranged at intervals on the base A, adjacent to the edge thereof, as shown in Fig. $3^b$, and female fastener members $A^3$, carried by the body B and engaging the members $A^2$ after the manner best shown in Fig. $3^a$. While I have shown one form of detachable connection, I desire it distinctly understood that any form of detachable connection or any kind of permanent connection may be employed without departure from the scope of my invention as claimed. The decoy in the embodiment shown in Figs. 1 to 3 may have an opening at either end without involving departure from my invention or an opening in either of its sides. I prefer, however, to have the body open at its upper side, as indicated by $c$, and to provide it with strings $d$, and I also prefer to crease the body, so as to adapt it to be folded on the transverse lines $e$ and $f$, the longitudinal median line $g$, the longitudinal line $h$, and the transverse line $i$. When the body is folded on the lines stated, it will be observed that the intermediate portion thereof will rest flat against the base or against the bottom of the body. When no base is employed, the head will rest flat against the intermediate portion, the beak will lie flat against the head, one end portion $j$ will rest flat against the intermediate portion, and the other end portion $k$ will lie flat against the head and the beak. From this it follows that the folded decoy is very compact and that a number of the same may be conveniently carried in a hunting bag or satchel. It will also be noticed that when the body is unfolded and set up, as shown in Fig. 3, the end portions $j$ and $k$ thereof extend beyond the ends of the base A or the ends of the bottom of the body when no base is employed, and, further, that in virtue of the body being formed of stiff paper or equivalent material and creased it will remain in an upright and distended condition without resort to inflation and without the employment of stuffing.

While it is not essential to stuff the body in order to keep it distended, the body may when desired be stuffed with grass, dry leaves, or the like, as indicated by C, and the opening $c$ in the body closed by tying the strings $d$ together.

While the body of the decoy constituting the embodiment described is shaped and embellished to simulate a duck, I desire it understood that the body may be shaped to look like any other bird or animal without departure from my invention.

The modified decoy shown in Figs. 4 to 6 has no base and also has no opening in its body for the introduction of stuffing. The said body, which is lettered B', is formed of stiff paper or other suitable material fitted for the purpose and is preferably shaped and embellished to simulate a duck, as shown. The said body comprises a bottom formed of a lower layer $n$ and upper layers $p$ and a longitudinal central portion $a'$, which extends from the inner edges of the layers $p$ after the manner best shown in Fig. 4 and is designed to be folded flat against one of the said layers $p$ when the decoy is to be packed for transportation. On its forward portion the said longitudinal central portion $a'$ is provided with a head and is adapted to be folded on the line $i$, Fig. 5, in a direction opposite to that in which said portion is first folded on the line $g'$. C C are strings connected to and extending outwardly from opposite sides of the longitudinal central portion $a'$ of the body and having handles D at their outer ends, and D' D' are finger-pieces attached to opposite sides of the head of the said portion $a'$.

The decoy shown in Figs. 4 and 5 is formed of the blank E, (shown in Fig. 6,) and when it is adapted to fold the said decoy the same is effected by pressing the longitudinal central portion $a'$ to the left and flat against the superposed bottom portion $n$ $p$ and by pressing the head toward the right and flat against the superposed portions $a'$, $p$, and $n$. When a hunter desires to use the said decoy, he has but to bend the portion $a'$ and the head thereon into an upright position and then draw outwardly, first on the strings C and then on the finger-pieces D'. When the strings C are pulled outwardly, the body will be distended, as shown by dotted lines in Fig. 4 and full lines in Fig. 5, and when the finger-pieces D' are pulled outwardly the head will likewise be distended, with the result that the decoy will closely simulate a live duck. Being hollow, the decoy will obviously float in an upright position on the water, and when it is used on calm still water there is no necessity of employing an anchor.

I have entered into a detailed description of the construction and relative arrangement of the parts embraced in the present and preferred embodiments of my invention in order to impart a full, clear, and exact understanding of the same. I do not desire, however, to be understood as confining myself to such specific construction and relative arrangement of parts, as such changes or modifications may be made in practice as fairly fall within the scope of my invention as claimed.

Having described my invention, what I claim, and desire to secure by Letters Patent, is—

1. As an article of manufacture, a decoy having a foldable body of stiff material, whereby when the body is unfolded and opened, it will remain of itself in such state; said body having an opening, and strings connected to it at opposite sides of the opening for the purpose of closing the said opening.

2. As an article of manufacture, a decoy comprising a base, and a body of stiff material arranged on and attached, to the base; the said body being provided with a bottom portion, a longitudinal central portion adapted to be pressed flat against the bottom portion, and a head adapted to be pressed flat against the superposed longitudinal central and bottom portions, and being calculated when unfolded and opened or distended, to remain of itself in such state.

3. As an article of manufacture, a decoy having a foldable body provided with a longitudinal central crease extending throughout its length, transverse creases intersecting the longitudinal central crease at points adjacent to the ends thereof, an opening for the introduction of stuffing, and means for closing said opening.

4. As an article of manufacture, a decoy comprising a base, and a foldable body attached, to the upper side of the base, and provided with a longitudinal central crease extending throughout its length, transverse creases intersecting the longitudinal central crease at points adjacent to the ends thereof, an opening in its top, and strings attached to it at opposite sides of said opening.

In testimony whereof I have hereunto set my hand in presence of two subscribing witnesses.

WHITTAKER RIGGS.

Witnesses:
R. L. COPY,
HENRY J. GASSIE.